United States Patent [19]

Knosby

[11] Patent Number: 4,597,495

[45] Date of Patent: Jul. 1, 1986

[54] LIVESTOCK IDENTIFICATION SYSTEM

[76] Inventor: Austin T. Knosby, R.R. #1, Cumming, Iowa 50061

[21] Appl. No.: 727,352

[22] Filed: Apr. 25, 1985

[51] Int. Cl.⁴ .......................... B07C 3/18; A22C 18/00
[52] U.S. Cl. ........................ 209/3.3; 17/1 R; 104/88; 198/349; 209/555; 209/583; 209/592; 364/478
[58] Field of Search .................. 209/3.1–3.3, 209/552, 555, 583, 592, 593, 509, 912; 198/349; 104/88; 414/273, 274; 364/403, 478; 17/1 R, 24

[56] References Cited

U.S. PATENT DOCUMENTS

| | | | |
|---|---|---|---|
| 3,695,462 | 10/1972 | Sullivan | 414/273 |
| 3,722,425 | 3/1973 | Allen | 104/88 |
| 4,021,336 | 5/1977 | Brook et al. | 209/593 |
| 4,239,435 | 12/1980 | Weiss et al. | 104/88 |
| 4,256,569 | 3/1981 | Wallace | 209/3.3 |
| 4,398,637 | 8/1983 | Fleury | 209/3.3 |

FOREIGN PATENT DOCUMENTS

| | | | |
|---|---|---|---|
| 3301904 | 7/1984 | Fed. Rep. of Germany | 209/583 |
| 3306175 | 8/1984 | Fed. Rep. of Germany | 209/583 |
| 0057757 | 5/1979 | Japan | 198/349 |
| 1029444 | 6/1984 | U.S.S.R. | 17/1 R |

Primary Examiner—Robert B. Reeves
Assistant Examiner—Donald T. Hajec
Attorney, Agent, or Firm—Henderson & Sturm

[57] ABSTRACT

An apparatus for identification of animals passing through a packing plant including an elevated track extending through the packing plant for guiding carcasses through various processes and testing stations. A plurality of trolleys, one for each carcass, is provided for moving along the track. A gambrel is provided for attaching such animal carcasses to the trolley. The trolley identification is operably attached to each of the trolleys for providing positive identification of each individual trolley. Animal identification is attached to each carcass which is hung from each gambrel for providing individual carcass identification information. A trolley identification reader is provided adjacent to the track for automatically reading each one of the trolley identification numbers and inputting the information into a computer. Similarly, a carcass identification reader is provided adjacent to the path of the carcasses being moved along the track and this information is also input into the computer. A program is provided for matching the trolley identification number with the carcass identification information. Various processing, testing and information stations are disposed along the track and trolley identification readers are also disposed along the track at such stations for automatically reading the trolley identification. Information at the station is input into the computer also at the time that such trolley identification is being made so that the station information can be matched up and fed into the computer so that the information from each station will be tied to a trolley number being read.

12 Claims, 7 Drawing Figures

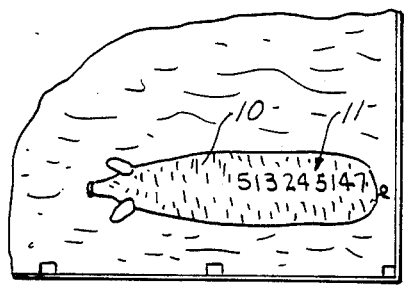
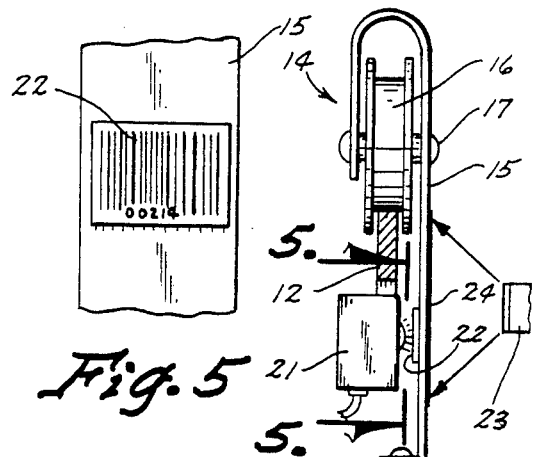
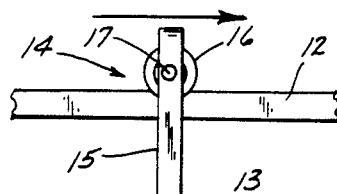
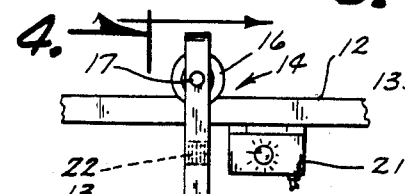
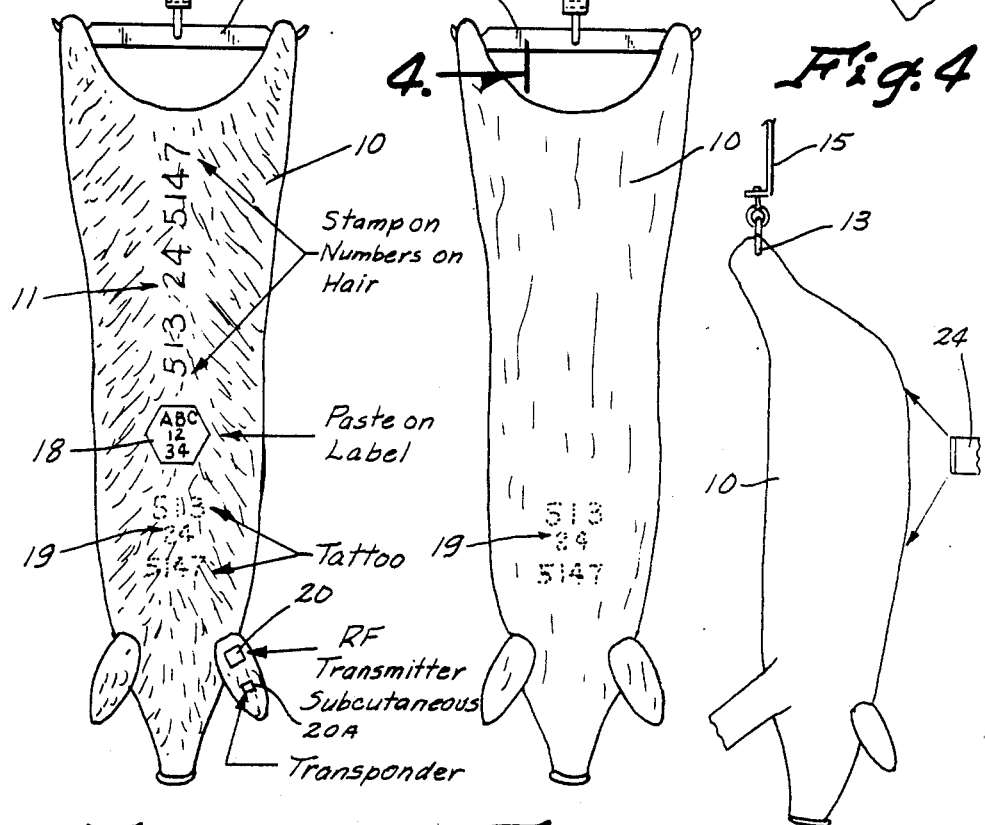

LIVESTOCK IDENTIFICATION SYSTEM

TECHNICAL FIELD

The present invention relates generally to a livestock identification system, and more particularly to the food producing meat animals. This is a total "trace back" system for the identification of each animal from birth through the animal's slaughter at the packing house.

BACKGROUND ART

The problem of how to identify animals is a longstanding one. Brands, numbered ear tags and tattoos are some of the ways that farmers or ranchers have utilized to try to identify livestock. These identification devices are used to establish ownership and permit somewhat of a "trace-back" system to trace the animals back to the origin. This "trace-back" system is utilized for livestock and poultry disease control, residue control, quarantine control, payment and grading controls for packing houses, inter and intra state movement controls, and for breeding husbandry controls.

One of the problems with the aforementioned identification systems is that none is universally acceptable. Furthermore, ear tags and other things attached to animals can fall off, thereby destroying the integrity of the system.

When animals are to be slaughtered and processed through a packing house, the problem of universal identification becomes quite apparent since there are no good systems to identify brands, tattoos placed at the farm or ranch, and ear tags. One system has been to apply tattoos to the carcass of the animal before it has been slaughtered with a hammer-like device having inked projections thereon. Then, once the animal has the hair taken off the carcass in the slaughtering process, the tattoo becomes visible and can be utilized to identify that particular animal's carcass.

One problem with the packing plant tattoo system is that at certain times trimming occurs, and at such time if a portion of the carcass having the tattoo thereon is undesirable, it will be trimmed off and the identification tattoo will be rendered useless. Also, in other cases the tattoo numbers refer only to a buying station and cannot be used for the animal's farm of origin "trace back".

There are many stations for performing tasks for taking samples throughout a packing plant and it is a problem to coordinate this information and identify it with the particular carcass and then identify that carcass with the owner to trace its origin and make payments for grade and yield purposes. Consequently, there is a need for an identification system which coordinates and simplifies this process.

DISCLOSURE OF THE INVENTION

The present invention relates to an apparatus for identification of animals passing through a packing plant and includes an elevated track extending through the packing plant for guiding carcasses through various slaughter processes and testing stations. A plurality of trolleys, one for each carcass, is provided for moving the slaughtered animals along the track. A gambrel is provided for attaching such animal carcasses to the trolley. The trolley identification is operably attached to each of the trolleys for providing positive identification of each individual trolley. Animal identification is attached to each carcass which is hung from each gambrel for providing individual carcass identification information. A trolley identification reader is provided adjacent to the track for automatically reading each one of the trolley identification numbers and inputting the information into a computer. Similarly, a carcass identification reader is provided adjacent to the path of the carcasses being moved along the track and this information is also input into the computer. A program is provided for matching the trolley identification number with the carcass identification information. Various processing, testing and information stations are disposed along the track and trolley identification readers are also disposed along the track at such stations for automatically reading the trolley identification. Information at the station is input into the computer also at the time that such trolley identification is being made so that the station information can be matched up and fed into the computer so that the information from each station will be tied to a trolley number being read. The track also has auxiliary tracks with switching mechanisms adjacent to each auxiliary track so that the computer and computer program can be utilized to sort the carcasses into categories such as by weight, by breed or gender and this information is utilized to selectively open or close the track switching devices which determine whether the trolley goes down a particular auxiliary track or not.

This system for the livestock to be identified "trace back" to the owner requires that the owner identify his animal with his identifying number, such as a social security number, or that this number be placed on the animal at the first point of sale, e.g., sale barns, buying station, terminal buying station, or packing plant, etc. Invoices with the owner's name, address, and identification number must prove with or accompany the animals. These invoices or bills of sale with the original owner's identification number is needed so as to be able to locate the person having the social security number that is identified on the animal.

An object of the present invention is to provide an improved identification system for animals passing through a packing plant.

Another object of the invention is to provide an automatic system of the aforementioned type.

A still further object of the invention is to provide an identification system which can track a particular animal back to its original owner for purposes of determining ownership, for disease control, residue control, quarantine control, payment and grading controls, breeding husbandry controls and for interstate and intrastate movement controls.

Other objects, advantages and novel features of the present invention will become apparent from the following detailed description of the invention when considered in conjunction with the accompanying drawings.

BRIEF DESCRIPTION OF THE DRAWINGS

FIG. 1 shows a top plan view of a live hog in a pen having the social security number of its owner dyed onto its back;

FIG. 2 is a side elevational view of the carcass of the hog shown in FIG. 1 attached to a gambrel and trolley in a packing house after it has been slaughtered and showing also a number of different identification systems thereon for alternative use;

FIG. 3 is a view similar to FIG. 2, but showing a carcass having the hair removed so that a tattoo having a social security number of the owner will visibly show, and also showing the trolley having a bar code thereon and a bar code reader for reading the bar code to identify the particular trolley passing thereby;

FIG. 4 shows a view of the trolley taken along line 4—4 of FIG. 3 and shows a bar code and a bar code reader as well as an alternate system using a video camera to read a trolley number written thereon;

FIG. 5 is a view taken along line 5—5 of FIG. 4 and showing the bar code attached to the trolley;

FIG. 6 is a side elevational view of a hog carcass as it passes by a video camera which will read the numbers off of the back of such carcass for ultimate automatic entry into a computer system.

BEST MODE FOR CARRYING OUT THE INVENTION

Figure 7:
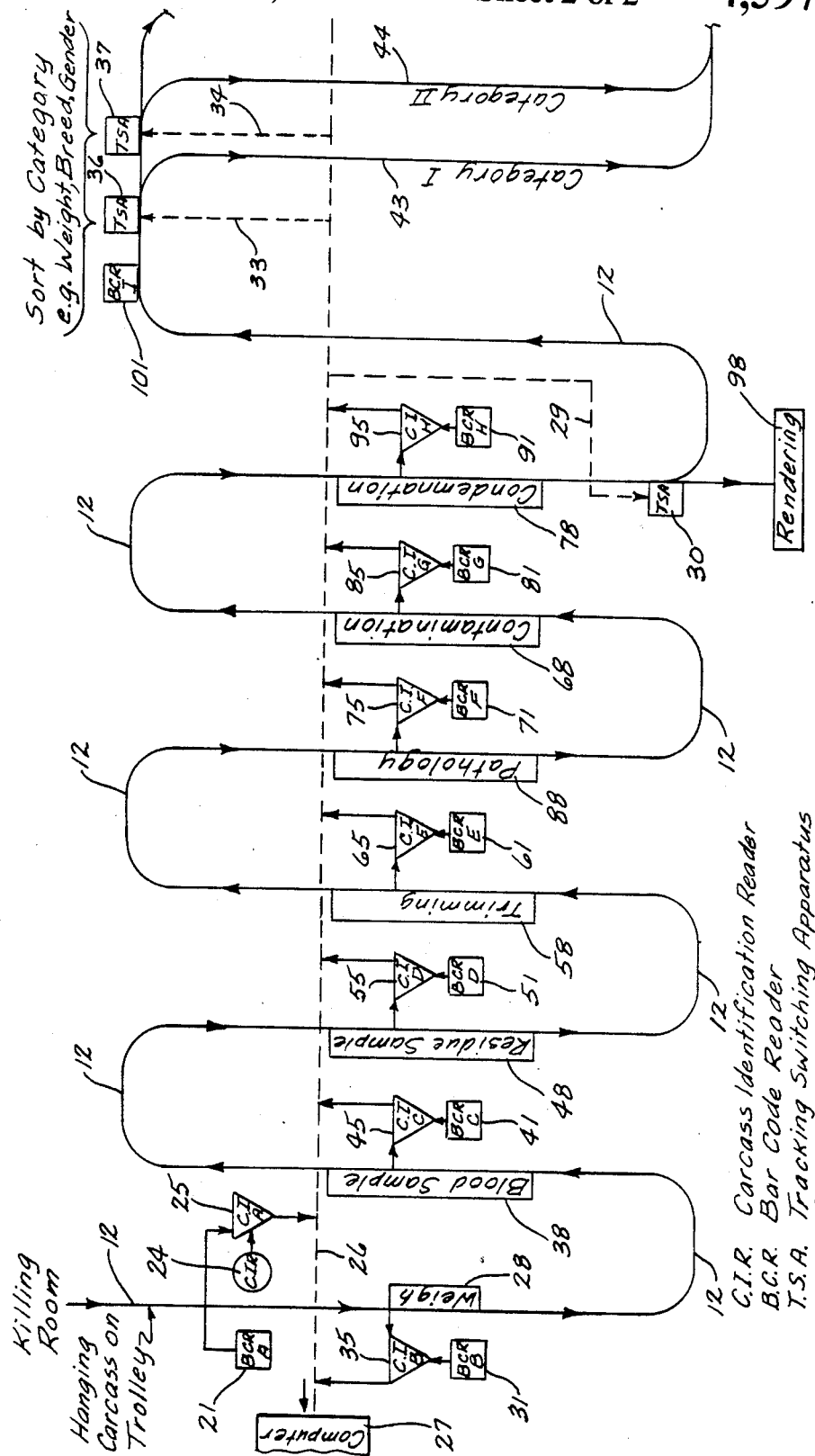
FIG. 7 shows a schematic view of a packing plant identification system constructed in accordance with the present invention.

Referring now to the drawings wherein like reference numerals designate identical or corresponding parts throughout the several views, FIG. 1 shows a hog (10) having numbers (11) dyed or painted onto the hair of the back of such animal (10). Referring to FIG. 2, it is noted that a track (12) is shown and this track (12) would extend through a packing plant in the manner shown in FIG. 7, for example. This track (12) would lead from a killing room to a place where the carcass is hung on a gambrel (13) as shown in FIG. 2. This gambrel (13) is connected to a trolley (14) having a strap (15) with a trolley wheel (16) rotatably attached thereto by an axle (17).

As shown in FIG. 2, the animal (10) is shown having a number of different identification structures thereon. The numbers (11) would be of a type applied by a dye or pair directly to the hair and could be read by a video camera or the like. A paste-on label (18) having letters or numbers thereon could also be read by a video camera, or alternatively this paper could have a bar code thereon and be read by a bar code reader, as will be explained below with respect to the trolley. A tattoo system (19) is normally not readable until the hair of such animal or carcass is removed but, as shown in FIG. 3, once the hair has been removed from the carcass, the tattoo is very visible. The element (20) is a radio frequency transmitter chip which can be read by a transponder using electromagnetic wave lengths to energize the transmitter (20) and having an antenna for catching the radio frequency waves transmitted therefrom and; also, this can be of a subcutaneous placed transponder or a transponder (20A) located in an ear piercing tag, which is energized by a scanning device to transmit its code using electromagnetic energy. A reader unit is used to display the code from the transponder (20A), the identification data is interfaced with the computer (27) for automatic handling.

Referring now to FIG. 7, it is noted that an animal taken to the killing room goes to a place where the carcass is hung on the trolley, for example as shown in FIG. 2, and from there it passes past a bar code reader "A" which has been numbered (21). The bar code reader will read a bar code (22), for example as shown in FIGS. 4 and 5, but it will be understood that instead of using a bar code reader (21) to read a bar code (22), a video camera (23), as shown in FIG. 4, could be utilized to read a number (24) attached directly to the member (15).

At approximately the same time that the bar code reader (21) is reading the bar code (22) off of the trolley (14), a carcass identification reader (24), shown in FIGS. 6 and 7, is reading the number (11) off the back of a carcass (10). This information from the trolley identification reader (21) and the carcass identification reader (24) is processed and sent by a computer input (25) to a computer input line (26), leading to a computer (27). A program inside of the computer is utilized to match the trolley identification information from the bar code reader (21) with the number from the carcass identification reader (24) so that from that point on, when the computer is given information from the bar code reader or other trolley identification reader such as (21), the output of the computer (27) will show that the carcass involved is the one just read by the carcass identification reader (24).

While in the preferred embodiment, this matching of the trolley to the carcass identification has been done when the carcass first starts out in its long process through the packing or slaughter plant, it will be understood that this matching could be done at a later time in the process, for example by reading the tattoo off of the carcass (10) shown in FIG. 3 after the hair has been removed and matching it with the trolley at such time if so desired.

Referring to FIG. 3, it is noted that the bar code reader (21) is positioned adjacent to the bar code (22). Another bar code reader (31) is adjacent to the track (12) so that when the carcass (11) and trolley (14) approaches a weigh station (28) the carcass identification reader (31) will read the number off of the trolley (14) and then put the information into a computer input (35). At the same time, the weight of the animal from the weigh station (28) will be input into the computer also through the computer input (35) and to the computer input line (26) so that the weight of the animal on the trolley (14) will be entered into the computer data associated with the animal (10).

Similarly, as the animal carcass (10) passes along the track (12), it will come to a blood sample station at which time the blood sample information will be fed into computer input (45) at the same time that the bar code reader (41) identifies the trolley (14). This information will be sent together back through computer line (26) to the computer (27) wherein the blood sample information (38) will be positively identified with the trolley number; and, because of the previous matching of the trolley number with the carcass number, this information will be automatically recorded under the carcass identification.

The carcass (10) will continue travelling on the trolley (14) all the way through the process through a residue sample station (48) wherein residue sample information will be fed into the computer input (55) while at the same time a bar code reader (51) will read the bar code (22) from the trolley (14). This matched information will be sent back to the computer (27) through line (26) as with the other stations. The carcass (10) will continue through a trimming station (58) which inputs trimming information into computer input (65), which is matched at the same time when the bar code reader (61) reads the bar code (22) and feeds the information back to the computer (27). The carcass (10) continues on the track (12) through a pathology station (88) feeding pathology information into computer input (75), while at the same time the bar code reader (71) picks up and matches it to the bar code (22) wherein this information is fed back into the computer (27).

The trolley (14) continues onto a contamination station (68) which feeds contamination information into a computer input (85) while at the same time a bar code reader (81) is picking up the identification number off of bar code (22) and this matched information is recorded in the computer (27). The trolley (14) continues on to a condemnation station (78) and any information about condemnation is input into a computer input (95), while at the same time a bar code reader (91) picks up the identification of the trolley (14) off of bar code (22) and sends this information back into the computer (27) for recording. If it turns out that the carcass (10) needs to be condemned, the computer, through its program, will send an input through the line (27) to a track switching apparatus (30) and this will cause the trolley (14) to go to the rendering station (98) rather than to continue on the main track (12).

For those carcasses continuing on the main track (12), the computer can be utilized to sort the carcasses by weight or breed or any other category desired and inputs can be made through lines (33) or (34) which will switch open the appropriate track switching apparatus (36) or (37) to cause the trolley (14) to pass into the proper one of the auxiliary tracks (43) or (44) depending upon whether they fall into category I or II as sorted out by the computer (27).

After the carcass (10) is removed from the gambrel (13) and taken out of the packing plant, then this trolley (14) can be utilized again, and the entire process would be repeated wherein a particular carcass is matched up with a particular trolley for identification and tracking purposes. The final result of this process is that a computer printout can be made which identifies the carcass by its owner and by having any other information such as the breed or gender associated therewith and having all of the inputs from each of these stations such as the weight, blood sample information, residue sample information, trimming information, pathology information, condemnation information and/or contamination information associated therewith. Additionally, grade and yield information and the payment to be made to the owner can all be programmed onto the computer. Additionally, those skilled in this art will understand and realize other tasks that can be performed using this information identification system which will still be within the spirit and scope of this present invention.

Obviously, many modifications and variations of the present invention are possible in light of the above teachings. It is therefore to be understood that, within the scope of the appended claims, the invention may be practiced otherwise than as specifically described.

I claim:

1. Apparatus for identification of animals passing through a packing plant comprising:
   an elevated track means extending through a packing plant for guiding carcasses through various processing and testing stations;
   a plurality of trolley means for moving along said track means;
   gambrel means for attaching an animal carcass to each of said trolley means;
   trolley identification means operably attached to each of said trolley means for providing positive identification of each individual trolley means;
   animal identification means attached to each carcass to be hung from each gambrel means for providing individual carcass identification information;
   a computer;
   trolley identification reader means disposed adjacent to said track means for automatically reading each one of said trolley identification means as it passes by said trolley identification reader means;
   means for inputting said trolley identification to said computer;
   carcass identification reader means disposed adjacent to the path of the carcasses being moved along said track means by said trolley means;
   means for inputting the carcass information from said carcass identification means into said computer; and
   program means for said computer for performing various tasks including matching the trolley identification with the carcass identification information for the carcass hanging from each respective trolley means whereby each said carcass can be identified from the trolley means from which it is hanging.

2. The apparatus of claim 1 further comprising:
   various processing testing, and information stations disposed along said track means;
   trolley identification reader means disposed at such various processing or information gathering stations along said track means for automatically reading said trolley identification;
   means for inputting each respective trolley identification into said computer at each of said stations;
   station information input means for inputting information about each respective carcass to said computer; and
   said program means including means for causing the computer to match the respective station information with the respective trolley identification.

3. The apparatus of claim 2 further comprising:
   auxiliary track means attached to said track means for sorting carcasses into categories;
   separate track switching means connected to said track means and to each respective auxiliary track for selectively causing said trolley means to travel in one of a plurality of directions; and
   means connected to said computer and to said each of said track switching means for permitting said sorting by category to be done automatically by the computer in combination with said program means.

4. The apparatus of claim 3 wherein one of said stations is a weigh station wherein the weight of the carcass is automatically matched by the computer and program means to the respective trolley identification.

5. The apparatus of claim 3 wherein one of said stations is a blood sampling station wherein blood sample information of each respective carcass is automatically matched by the computer and the program means to the respective trolley identification.

6. The apparatus of claim 1 wherein said trolley identification means is a bar code and said trolley identification reader means is a bar code reader.

7. The apparatus of claim 1 wherein said trolley identification means is a number operably attached to said trolley means and said trolley identification reader means is a video camera.

8. The apparatus of claim 1 wherein said animal identification means is a label glued to said animal.

9. The apparatus of claim 1 wherein said animal identification means includes numbers dyed onto the hair of the animal and the carcass identification reader is a video camera.

10. The apparatus of claim 1 wherein said animal identification means is a tatoo on the skin of an animal which can be read after the hair of the animal is removed.

11. The apparatus of claim 1 wherein said animal identification means is a coded radio frequency wave transmitter and said carcass identification reader means is transponder means for sending electromagnetic energy to said transmitter for causing said transmitter to transmit radio frequency waves including a coded indentification, said transponder also including antenna means for receiving said radio frequency waves.

12. The apparatus of claim 1 wherein said animal identification means is a transponder and said carcass identification reader is a scanning means for transmitting a code using electromagnetic energy and including a read-out means for displaying said code.

* * * * *